US007536712B2

(12) United States Patent
Kaler et al.

(10) Patent No.: US 7,536,712 B2
(45) Date of Patent: May 19, 2009

(54) FLEXIBLE ELECTRONIC MESSAGE SECURITY MECHANISM

(75) Inventors: Christopher J. Kaler, Sammamish, WA (US); John P. Shewchuk, Redmond, WA (US); Giovanni M. Della-Libera, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 10/693,290

(22) Filed: Oct. 23, 2003

(65) Prior Publication Data

US 2004/0088585 A1    May 6, 2004

Related U.S. Application Data

(63) Continuation-in-part of application No. 10/219,898, filed on Aug. 14, 2002, now Pat. No. 7,293,283.

(60) Provisional application No. 60/329,796, filed on Oct. 16, 2001, provisional application No. 60/346,370, filed on Oct. 19, 2001.

(51) Int. Cl.
*G06F 7/04* (2006.01)
*H04L 9/32* (2006.01)
*G06F 21/00* (2006.01)

(52) U.S. Cl. ............................... 726/5; 713/186; 726/6

(58) Field of Classification Search ................ 726/5, 726/6; 713/186
See application file for complete search history.

(56) References Cited

U.S. PATENT DOCUMENTS 4,953,210 A    8/1990    McGlynn
5,067,104 A    11/1991    Krishnakumar (Continued)

FOREIGN PATENT DOCUMENTS

EP            0715246         6/1996

(Continued)

OTHER PUBLICATIONS

Kees Leune, Mike Papazoglou, Willem-Jan van den Heuvel, "Specification and querying of securty constraints in the EFSOC framework", Nov. 2004, ICSOC '04: Proceedings of the 2nd international conference on Service oriented computing, pp. 125-133.*

(Continued)

*Primary Examiner*—Matthew B Smithers
*Assistant Examiner*—Courtney D Fields
(74) *Attorney, Agent, or Firm*—Workman Nydegger

(57) ABSTRACT

Multiple different credentials and/or signatures based on different credentials may be included in a header portion of a single electronic message. Different recipients of intermediary computing systems may use the different credentials/signatures to identify the signer. The electronic message may include an encoding algorithm and a type identification of a credential included in the electronic message, allowing the recipient to decode and process the credential as appropriate given the type of credential. Also, the electronic message may include a pointer that references a credential associated with a signature included in the electronic message. That referenced credential may be accessed from the same electronic message, or from some other location. The recipient may then compare the references credential from the credentials used to generate the signature. If a match occurs, the integrity of the electronic message has more likely been preserved.

53 Claims, 6 Drawing Sheets

U.S. PATENT DOCUMENTS

| | | | |
|---|---|---|---|
| 5,224,098 A | 6/1993 | Bird | |
| 5,438,508 A * | 8/1995 | Wyman | 705/26 |
| 5,499,343 A | 3/1996 | Pettus | |
| 5,509,000 A | 4/1996 | Oberlander | |
| 5,608,551 A | 3/1997 | Biles | |
| 5,680,551 A | 10/1997 | Martino | |
| 5,761,477 A | 6/1998 | Wahbe | |
| 5,862,411 A | 1/1999 | Kay | |
| 5,903,882 A | 5/1999 | Asay et al. | 705/44 |
| 5,917,912 A | 6/1999 | Ginter | |
| 5,935,219 A | 8/1999 | Holmes | |
| 5,968,176 A | 10/1999 | Nessett | |
| 5,974,416 A | 10/1999 | Anand | |
| 5,978,836 A | 11/1999 | Ouchi | |
| 6,006,259 A | 12/1999 | Adelman | |
| 6,026,441 A | 2/2000 | Ronen | |
| 6,047,324 A | 4/2000 | Ford | |
| 6,119,171 A | 9/2000 | Alkhatib | |
| 6,122,363 A | 9/2000 | Friedlander | |
| 6,144,961 A | 11/2000 | de la Salle | |
| 6,151,618 A | 11/2000 | Wahbe | |
| 6,158,010 A | 12/2000 | Moriconi | |
| 6,167,513 A | 12/2000 | Inoue | |
| 6,199,112 B1 | 3/2001 | Wilson | |
| 6,209,124 B1 | 3/2001 | Vermeire et al. | 717/1 |
| 6,216,231 B1 | 4/2001 | Stubblebine | |
| 6,219,790 B1 | 4/2001 | Lloyd | |
| 6,233,619 B1 | 5/2001 | Narisi | |
| 6,243,749 B1 | 6/2001 | Sitaraman | |
| 6,304,913 B1 | 10/2001 | Rune | |
| 6,351,748 B1 | 2/2002 | Deen et al. | 707/10 |
| 6,356,920 B1 | 3/2002 | Vandersluis | 707/501 |
| 6,393,456 B1 | 5/2002 | Ambler et al. | 709/200 |
| 6,405,337 B1 | 6/2002 | Grohn | |
| 6,408,342 B1 | 6/2002 | Moore | |
| 6,446,113 B1 | 9/2002 | Ozzie et al. | 709/204 |
| 6,449,638 B1 | 9/2002 | Wecker et al. | 709/217 |
| 6,453,356 B1 | 9/2002 | Sheard | |
| 6,466,971 B1 | 10/2002 | Hupleman et al. | 709/220 |
| 6,477,580 B1 | 11/2002 | Bowman-Amuah | 709/231 |
| 6,496,849 B1 | 12/2002 | Hanson et al. | 709/200 |
| 6,505,233 B1 | 1/2003 | Hanson et al. | 709/204 |
| 6,505,254 B1 | 1/2003 | Johnson | |
| 6,507,823 B1 | 1/2003 | Nel | |
| 6,507,865 B1 | 1/2003 | Hason et al. | 709/206 |
| 6,522,631 B2 | 2/2003 | Rosborough | |
| 6,523,063 B1 | 2/2003 | Miller et al. | 709/206 |
| 6,532,213 B1 | 3/2003 | Chiussi | |
| 6,532,455 B1 | 3/2003 | Martin et al. | 706/47 |
| 6,546,419 B1 | 4/2003 | Humpleman et al. | 709/233 |
| 6,571,236 B1 | 5/2003 | Ruppelt | |
| 6,578,066 B1 | 6/2003 | Logan | |
| 6,601,171 B1 | 7/2003 | Carter | |
| 6,601,189 B1 | 7/2003 | Edwards | |
| 6,615,258 B1 | 9/2003 | Barry | |
| 6,618,825 B1 | 9/2003 | Shaw | |
| 6,654,344 B1 | 11/2003 | Toporek | |
| 6,667,974 B1 | 12/2003 | Shigeta | |
| 6,675,261 B2 | 1/2004 | Shandony | |
| 6,678,827 B1 | 1/2004 | Rothermel | |
| 6,724,726 B1 | 4/2004 | Coudreuse | |
| 6,728,767 B1 | 4/2004 | Day | |
| 6,742,114 B1 | 5/2004 | Carter | |
| 6,748,453 B2 | 6/2004 | Law | |
| 6,751,562 B1 | 6/2004 | Blackett | |
| 6,763,040 B1 | 7/2004 | Hite | |
| 6,782,414 B1 | 8/2004 | Xue | |
| 6,789,118 B1 | 9/2004 | Rao | |
| 6,850,979 B1 | 2/2005 | Saulpaugh | |
| 6,851,054 B2 | 2/2005 | Wheeler | |
| 6,858,093 B2 | 2/2005 | Albu | |
| 6,891,953 B1 | 5/2005 | DeMello | |
| 6,920,558 B2 | 7/2005 | Sames | |
| 6,928,442 B2 | 8/2005 | Farber | |
| 6,970,935 B1 | 11/2005 | Maes | |
| 6,976,074 B2 | 12/2005 | Cabrera | |
| 6,990,585 B2 * | 1/2006 | Maruyama et al. | 713/176 |
| 7,051,339 B2 | 5/2006 | Deverill | |
| 7,127,511 B2 | 10/2006 | Tonouchi | |
| 7,149,802 B2 | 12/2006 | Cabrera | |
| 7,194,553 B2 | 3/2007 | Lucco | |
| 7,257,817 B2 | 8/2007 | Cabrera | |
| 7,409,367 B2 | 8/2008 | McGill | |
| 7,418,457 B2 | 8/2008 | Kaler | |
| 7,451,157 B2 | 11/2008 | Kaler | |
| 2001/0009018 A1 | 7/2001 | Iizuka | |
| 2002/0002581 A1 | 1/2002 | Siddiqui | |
| 2002/0049906 A1 | 4/2002 | Maruyama et al. | 713/176 |
| 2002/0078233 A1 | 6/2002 | Brilis | |
| 2002/0126701 A1 | 9/2002 | Requena | |
| 2002/0138582 A1 | 9/2002 | Chandra et al. | 709/206 |
| 2002/0143984 A1 | 10/2002 | Hudson | |
| 2002/0152214 A1 | 10/2002 | Muntz | |
| 2002/0157004 A1 | 10/2002 | Smith et al. | 713/176 |
| 2002/0169781 A1 | 11/2002 | Poole et al. | 707/100 |
| 2002/0174178 A1 | 11/2002 | Stawikowski | |
| 2002/0178103 A1 | 11/2002 | Dan | |
| 2002/0188638 A1 | 12/2002 | Hamscher | 707/530 |
| 2003/0041178 A1 | 2/2003 | Brouk et al. | 709/313 |
| 2003/0065942 A1 | 4/2003 | Lineman | |
| 2003/0074482 A1 | 4/2003 | Christensen et al. | 709/313 |
| 2003/0074579 A1 | 4/2003 | Della-Libera | |
| 2003/0093678 A1 | 5/2003 | Bowe et al. | 713/180 |
| 2003/0120593 A1 | 6/2003 | Bansal | |
| 2003/0159059 A1 | 8/2003 | Rodriquez | |
| 2005/0138353 A1 * | 6/2005 | Spies et al. | 713/153 |
| 2006/0041743 A1 | 2/2006 | Della-Libera | |
| 2006/0041929 A1 | 2/2006 | Della-Libera | |
| 2006/0212599 A1 | 9/2006 | Lucco | |
| 2006/0253699 A1 | 11/2006 | Della-Libera | |
| 2006/0253700 A1 | 11/2006 | Della-Libera | |
| 2008/0141028 A1 * | 6/2008 | Wei et al. | 713/160 |

FOREIGN PATENT DOCUMENTS

| | | |
|---|---|---|
| EP | 1003308 | 5/2000 |
| EP | 1024627 | 8/2000 |
| EP | 1118925 | 7/2001 |
| JP | 2000-516406 | 12/2000 |
| JP | 2000-516407 | 12/2000 |
| WO | 95/34972 | 12/1995 |
| WO | 99/37066 | 7/1999 |
| WO | 00/04458 | 1/2000 |
| WO | 00/08909 | 2/2000 |
| WO | 00/42748 | 7/2000 |
| WO | 01/46783 | 6/2001 |
| WO | 01/52496 | 7/2001 |
| WO | 01/58108 | 8/2001 |
| WO | 2007/073609 | 7/2007 |
| WO | WO 2007073609 A1 * | 7/2007 |

OTHER PUBLICATIONS

Soap Security Extensions: Digital Signature W3C Note Feb. 6, 2001 http://www.w3.org/TR/2001/NOTE-SOAP-dsig-20010206/.

IP Encapsulating Security Payload (ESP) IPsec Working Group Internet Draft Draft-ietf-ipsec-esp-v3-03.txt, Expires Jan. 2003 S. Kent, BBN Technologies, Jul. 2002.

Office Action Mailed Nov. 11, 2003.

Office Action Mailed Apr. 21, 2004.

Office Action Mailed Oct. 6, 2004.

Office Action Mailed Oct. 26, 2006.

Office Action Mailed Mar. 26, 2007.

Notice of Allowance mailed Aug. 15, 2007 in related case U.S. Appl. No. 10/219,898.

U.S. Appl. No. 10/219,898, filed Aug. 14, 2002, Kaler et al.
http://www.w3.org/TR/2001/PR-xmldsig-core-20010820/.
Eastlake et al. RFC 3075 XML Signature Syntax and Processing.
An Introduction to XML Digital Signatures, Simon et al, http://www.xml.com/pub/a/2001/08/08/xmldsig.html.
"TIBCO Rendezvous - a TIBCO Active Enterprise Product", http://www.tibco.com/products/rv/index.html, printed Dec. 10, 2001, 2 Pages.
"TIBCO Rendezvous TX- a TIBCO Active Enterprise Product", http://www.tibco.com/products/rv/rvtx.html, Printed Dec. 10, 2001 2 Pages.
"TIBCO Enterprise for JMS", http://www.tibco.com/products/enterprise_for_hms.html, printed Dec. 10, 2001, 1 Page.
Henrick F. Nielsen et al., "SOAP Routing Protocol", http://www.gotdot.com/team.xml_wsspecs/soap-rp/default.html, May 23, 2001, 36 Pages.
G. Robert Malan et al., "An Extensible Probe Architecture for Network Protocol Performance Measurement", Department of Electrical Engineering and Computer Science, University of Michigan, SIGCOMM 1998, Vancouver, pp. 215-227.
Kunihiko Toumura et al., "Implementing Multiple Name Spaces Using An Activve Network Technology", Jun. 2003, pp. 1665-1676.
David Potter et al., "Connecting minis to local nets with discrete modules", Data Communications, Jun. 1983, pp. 161-164.
Steven M Dean et al., "CONE: A Softeare Environment for Network Protocols", Hewlett-Packard Journal, Feb. 1990, pp. 18-28.
Fumiko Kouda et al., "Representation of Descriptive Name and the Resolution Method with a Semantic Network Structure", Journal of Information Processing, vol. 15, No. 2, 1992, pp. 280-292.
Henrick F. Nielsen et al., "Direct Internet Message Encapsulation", May 23, 2001, 13 Pages.
B.Ramsey, "An RTOS with its Nest is Pure Dynamite", Electronic Engineering Times Sep. 11, 1005, No. 865, p. 76, 3 Pages.
Richard Bowers, "Apple's Free Internet Domain Name Server Software", Post-Newsweek Business Intormation, Inc., May 2, 1996, 1 Page.
Kees Leune, Mike Papazoglou, Willem-Jan Van Den Heuvel, "Specification and Querying of Security Constraintss in the EFSOC Framwork", Nov. 2004, ICSOc '04: Proceedings of the 2nd International Conference on Service Oriented Computing, pp. 125-133.
Partial European Search Report dated Apr. 19, 2006 (02023016.5), 3 pages.
Rotzal, Peter H., "X 400 Message Handling System: The Remote User Agent," Proceedings of the Military Communications Conference (MILCOM), Jun. 11, 1995, vol. 1, pp. 433-437.
European Search Report dated Jun. 28, 2006 (02023016.5), 6 pages.
Mourad, A. et al., "Scalable Web Server Architectures"; Proceeding IEEE International Symposium on Computer and Communications; Jul. 1, 1999; pp. 12-16; WP000199852.
Nikkei Network, No. 17, Sep. 2001, pp. 94-97.
"Windows NT TCP/IP Networking 9. DNS (Domain Name System)", Let's Start with TCP/IP, Dec. 31, 2000, pp. 156-159.
"Preliminary Knowledge for Managing a Website, Basic Knowledge of Domain Name," Basics of Creating a Website Which Can Be Understood With the Help of Illustration, Aug. 31, 2000, pp. 179-185.
Nikkei Network, No. 4, Aug. 2000, pp. 104-112.
Nikkei Byte, No. 211, Dec. 2000, pp. 176-181.
Nikkei Communications, No. 355, Feb. 5, 2001, pp. 106-113.
Nikkei Communications, No. 340, Apr. 16, 2001, pp. 216-217.
Benner, Russell, "Practical Hifh-Impedance Fault Detection on Distribution Feeders", Journal - IEEE Transactions on Industry Applications, vo. 33, No. 3, p. 635-640, publication date May-Jun. 1997, USA.
"XML Schema Part 0: Primer", W3C Proposed Recommendation, Mar. 30, 2001, 64 Pages (Dec. 11, 2004).
CCIE Fundamentals: Network Design and Case Studies, Second Edition, by Cisco Systems, Inc. Publisher: Cisco Press, Publication Date: Oct. 19, 1999, Print ISBN - 10: 1-57870-167-8.
European Search Report - Application No. 02023017 - Oct. 6, 2005.
Xinghuo Yu; Zhihong Man; "Finite *time* *output* Tracking Problem woth Terminal Sliding Mode Control," Computational Engineering in Systems Applications, Part vol. 1, pp. 28-31, vol. 1, Publisher: Gerf EC Lille - Cite Scientifique, Lille France.

Edge, S.W. "An Adaptive *timeout* Algorithm for Retransmission Across a Packet Switching Network", Computer Communication Review, vol. 14, No. 2, pp. 248-255, Publisher in USA. Jun. 1984.
Wallstrom, Bengt, "Queueing System with *Time*-*Outs* and Random Departures", Ericsson Techincs, v 33 n 2 1977, pp. 151-174.
11. Using Dublin Core, issued Jul. 16, 2000 by Diane Hillmann, pp. 1-10.
Structured Graph Format: XML Metadata for describing website structure, Liechi et al. pp. 11-21, Issued 1998.
Samjani, "Mobile Internet Protocol", IEEE Potentials, vol. 20, No. 1, Feb.-Mar. 2001, pp. 16-18.
"IP Routing Policies and Filters", printed from http://support.baynetworks.com/library/tpubs/html/switches/bstream/115401A/L_17.htm on Sep. 26, 2002.
K. Swaminathan, "Negotiated Access Control", Proceedings of the 1985 Symposium on Security and Privacy: Apr. 22-24, 1985, pp. 190-196.
W. LeFebvre, "Permissions and Access Contol Lists", Performance Computing, vol. 16, No. 11, Oct. 1998, pp. 59-61.
B. Dunkel et al., "Customized Metadata for Internet Information", 1997 First International Conference on Knowledge-Based Intelligent Electronic Systems: Proceedings, vol. 2, May 21-23, 1997, pp. 508-516.
U. Srinvasan et al., "Managing Heterogenous Information Systems through Discovery and Retrieval of Generic Concepts", Journal of the American Society foro Information Science, vol. 51, No. 8, Jun. 2000, pp. 707-723.
J. Martinez et al., "MPEG-7 the Generic Mulitmedia Content Description Standard, Part 1", vol. 9, No. 2, Apr.-Jun. 2002, pp. 78-87.
C. Süβ et al., "Meta-modeling for Web-Based Teachware Management", Advance in Conceptual Modeling: ER '99 Workshops on Evolution and Change in Data Management, Reverse Engineering in Information Systems, and the World Wide Web and Conceptual Modeling, 1999, 360-373.
K. Lang et al., "XML, Metadata and efficient Knowledge Discovery", Knowledge-Based Systems, vol. 13, No. 5, Oct. 2000, pp. 321-331.
T. Baker, "A Multilingual Registry for Dublin Core Elements and Qualifiers", ZfBB 47, 2000, pp. 14-19.
J. Moy, OSPF Version 2, Networking Working Group, RFC 2328, Ascend Communications, Inc., Apr. 1998, pp. 1-204.
J. Moy, OSPF Version 2, Networking Working Group, RFC 1247, Proteon, Inc., Jul. 1991, pp. 1-177.
Office Action dated Jan. 7, 2005 cited in U.S. Appl. No. 09/983,555.
Office Action dated Jul. 7, 2005 cited in U.S. Appl. No. 09/983,555.
Office Action dated Mar. 23, 2006 cited in U.S. Appl. No. 09/983,555.
Office Action dated Sep. 11, 2006 cited in U.S. Appl. No. 09/983,555.
Office Action dated Sep. 21, 2004 cited in U.S. Appl. No. 09/993,656.
Office Action dated Dec. 23, 2004 cited in U.S. Appl. No. 09/993,656.
Office Action dated Aug. 19, 2005 cited in U.S. Appl. No. 09/993,656.
Office Action dated Nov. 29, 2005 cited in U.S. Appl. No. 09/993,656.
Notice of Allowance dated May 25, 2007 cited in U.S. Appl. No. 09/993,656.
Office Action dated Dec. 30, 2004 cited in U.S. Appl. No. 09/983,539.
Office Action dated Jun. 17, 2005 cited in U.S. Appl. No. 09/983,539.
Office Action dated Jan. 18, 2006 cited in U.S. Appl. No. 09/983,539.
Notice of Allowance dated May 8, 2006 cited in U.S. Appl. No. 09/983,539.
Office Action dated Oct. 4, 2005 cited in U.S. Appl. No. 10/068,444.
Office Action dated Mar. 31, 2006 cited in U.S. Appl. No. 10/068,444.
Office Action dated Oct. 13, 2006 cited in U.S. Appl. No. 10/068,444.
Office ACction dated Mar. 23, 2006 cited in U.S. Appl. No. 11/254,264.
Office Action dated Aug. 11, 2006 cited in U.S. Appl. No. 11/254,264.
Office Action dated Mar. 7, 2007 cited in U.S. Appl. No. 11/254,264.

Office Action dated Aug. 7, 2007 cited in U.S. Appl. No. 11/254,264.
Office Action dated May 29, 2008 cited in U.S. Appl. No. 11/254,264.
Office Action dated Nov. 17, 2008 cited in U.S. Appl. No. 11/254,264.
Office Action dated May 28, 2008 cited in U.S. Appl. No. 11/254,545.
Office Action dated May 28, 2008 cited in U.S. Appl. No. 11/254,539.
Office Action dated Mar. 7, 2006 cited in U.S. Appl. No. 11/254,519.
Office Action dated Aug. 11, 2006 cited in U.S. Appl. No. 11/254,519.
Office Action dated Nov. 5, 2004 cited in U.S. Appl. No. 10/007,060.
Office Action dated May 11, 2005 cited in U.S. Appl. No. 10/007,060.
Notice of Allowance dated Jun. 27, 2005 cited in U.S. Appl. No. 10/007,060.
Office Action dated Jul. 20, 2005 cited in U.S. Appl. No. 10/999,837.
Office Action dated Dec. 21, 2005 cited in U.S. Appl. No. 10/999,837.
Office Action dated May 25, 2006 cited in U.S. Appl. No. 10/999,837.
Notice of Allowance dated Sep. 18, 2006 cited in U.S. Appl. No. 10/999,837.

* cited by examiner

FLEXIBLE ELECTRONIC MESSAGE SECURITY MECHANISM

CROSS-REFERENCE TO RELATED APPLICATION

The present application is a continuation-in-part application of commonly-assigned U.S. patent application Ser. No. 10/219,898 filed Aug. 14, 2002 now U.S. Pat. No. 7,293,283 and entitled "Flexible Electronic Message Security Mechanism." That patent application claims priority to U.S. provisional patent application Ser. No. 60/329,796 entitled "System and Method for Security, Licensing and Naming" filed Oct. 16, 2001, and claims priority to U.S. provisional patent application Ser. No. 60/346,370 also entitled "System and Method for Security, Licensing and Naming" filed Oct. 19, 2001.

BACKGROUND OF THE INVENTION

1. The Field of the Invention

The present invention relates to electronic messaging, and more particularly, to mechanisms for allowing more flexible use of security mechanisms when communicating using electronic messages.

2. Related Technology

Computing technology has transformed the way we work and play. Modem computer networking technologies and infrastructures allow for different applications and users to communicate data electronically even over vast distances relatively quickly using readily-available computing systems. Such computing systems may include, for example, desktop computers, laptop computers, Personal Digital Assistants (PDAs), digital telephones, or the like.

Currently, computing systems are so interconnected that one computing system is literally capable of communicating with any one of many millions of other computing systems spread throughout the globe. This is useful as we are now able to communicate more readily. However, this high level of interconnectivity also exposes us to security problems. For example, often it is necessary to verify that a computing device or associated user is truly the same entity that they purport to be in a process called authentication. Also, it is often important to validate the integrity of an electronic message to be sure that the electronic message has not been compromised during transmission.

Improvements in security mechanisms are of significant benefit since breaches in security can cause much harm, financial and otherwise, to entities who rightfully desire secure electronic communications. The principles of the present invention improve security over conventional security technologies as will be described in further detail below.

BRIEF SUMMARY OF THE INVENTION

The principles of the present invention relate to mechanisms for providing reliable and flexible security mechanisms when communicating using electronic messages. The electronic message may have multiple different types of credentials. The electronic message may include the encoding format and type of each of the credentials thus allowing for convenient access of the credential by either the recipient computing system, or by an intermediary computing system. The electronic message may also include multiple signatures that were each signed using a different credential. The signatures may each have a reference to a location even external to the electronic message. The recipient computing system may evaluate the external credential against the signature to determine whether tampering of the electronic message may have occurred.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
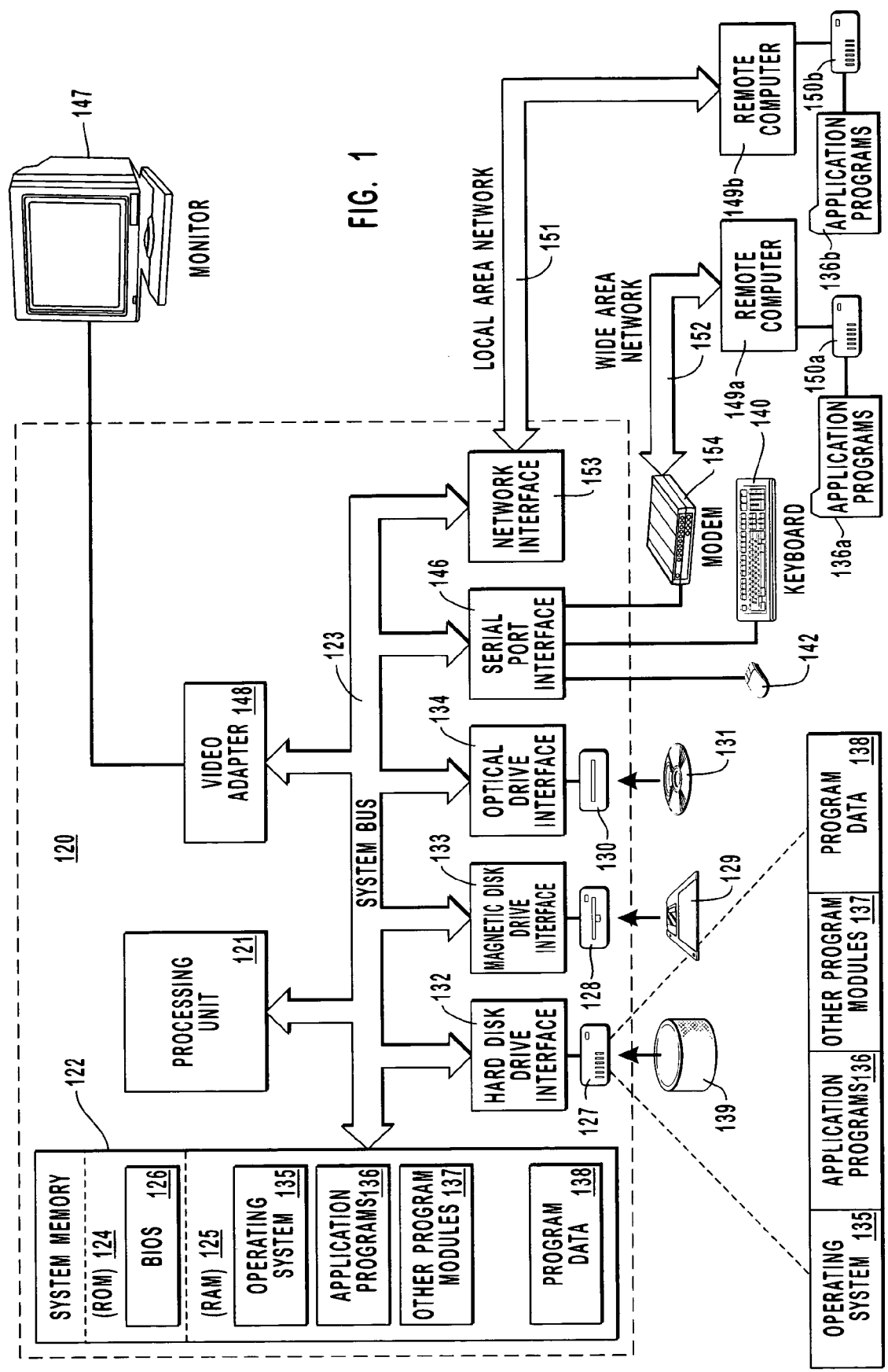
FIG. 1 illustrates a suitable computing system in which the principles of the present invention may be employed.

The principles of the present invention relate to methods, systems, computer program products, and data structures that allow more secure communications of an electronic message. Multiple different credentials and/or signatures based on different credentials may be included in a header portion of a single electronic message. These different signatures and/or credentials may be used by different recipient computing systems, by a single recipient computing system, or even by different computing systems along a routing path of the electronic message.

The electronic message may include an identification of an encoding algorithm and the type of credential included in the electronic message. Accordingly, multiple different credentials may be included that have different encoding. The recipient computing system may decode and process the credential as appropriate given the identification of the encoding algorithm and the type of credential.

Also, the electronic message may include a pointer that references a credential that is accessible to the recipient computing system, either within the same electronic message, or from some other location. The recipient computing system may then compare the referenced credentials from the credentials used to generate the signature. If a match occurs, then the data signed can be associated with the credentials. Accordingly, the integrity of any statement made in the credentials such as identity, rights, and so forth, may be verified.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. The computer-readable media may include at least partially run-time memory that holds data structures and modules that exist at run-time. The computer-readable media may also include persistent memory that stores data structures that persist regardless of the existence and/or reliability of externally supplied power.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, and the like, that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 2:
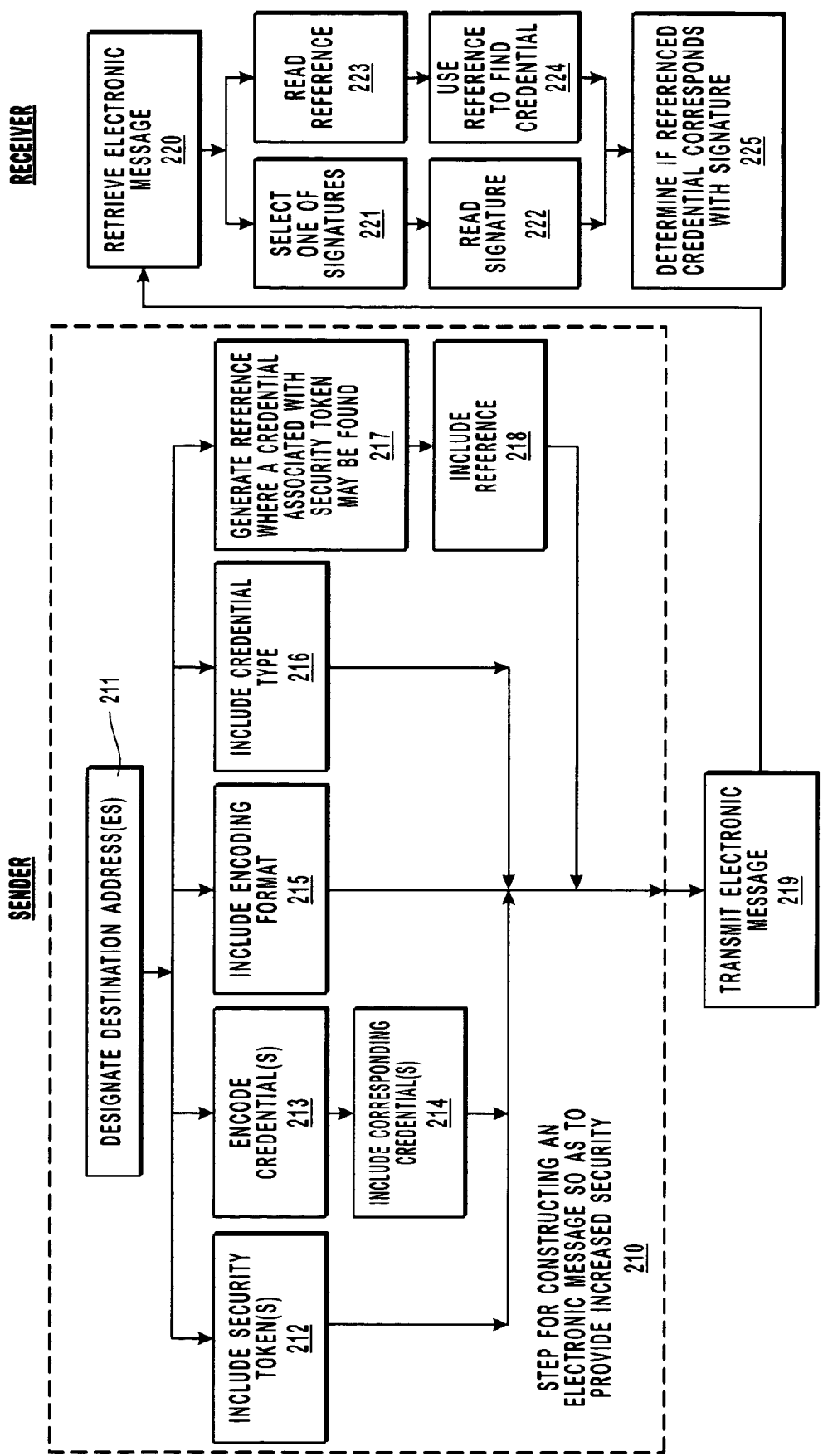
FIG. 2 illustrates a flowchart of a method for securely transmitting an electronic message in accordance with the principles of the present invention.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. Throughout this description, element numbers begin with the same number as the figure in which the corresponding elements were first introduced. For example, all of the element numbers in FIG. 1 are numbered in the 100's while the element numbers in FIG. 2 are number in the 200's, and so forth.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149*a* and 149*b*. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 illustrates an example of a computing system that may implement the principles of the present invention, any computing system may implement the features of the present invention. In the description and in the claims, a "computing system" is defined as any hardware component or components that are capable of using software to perform one or more functions. Examples of computing systems include desktop computers, laptop computers, Personal Digital Assistants (PDAs), telephones, or any other system or device that has processing capability.

FIG. 2 illustrates a method 200 for performing electronic messaging in a secure manner. Some of the acts and the step of the method 200 are performed by a sender computing system that sends an electronic message. Those acts and that step are generally listed in the left column of FIG. 2 under the heading "SENDER". Other acts of the method 200 that are performed may be a receiver computing system that receives the electronic message. Those acts are generally listed in the right column of FIG. 2 under the heading "RECEIVER".

Figure 3:
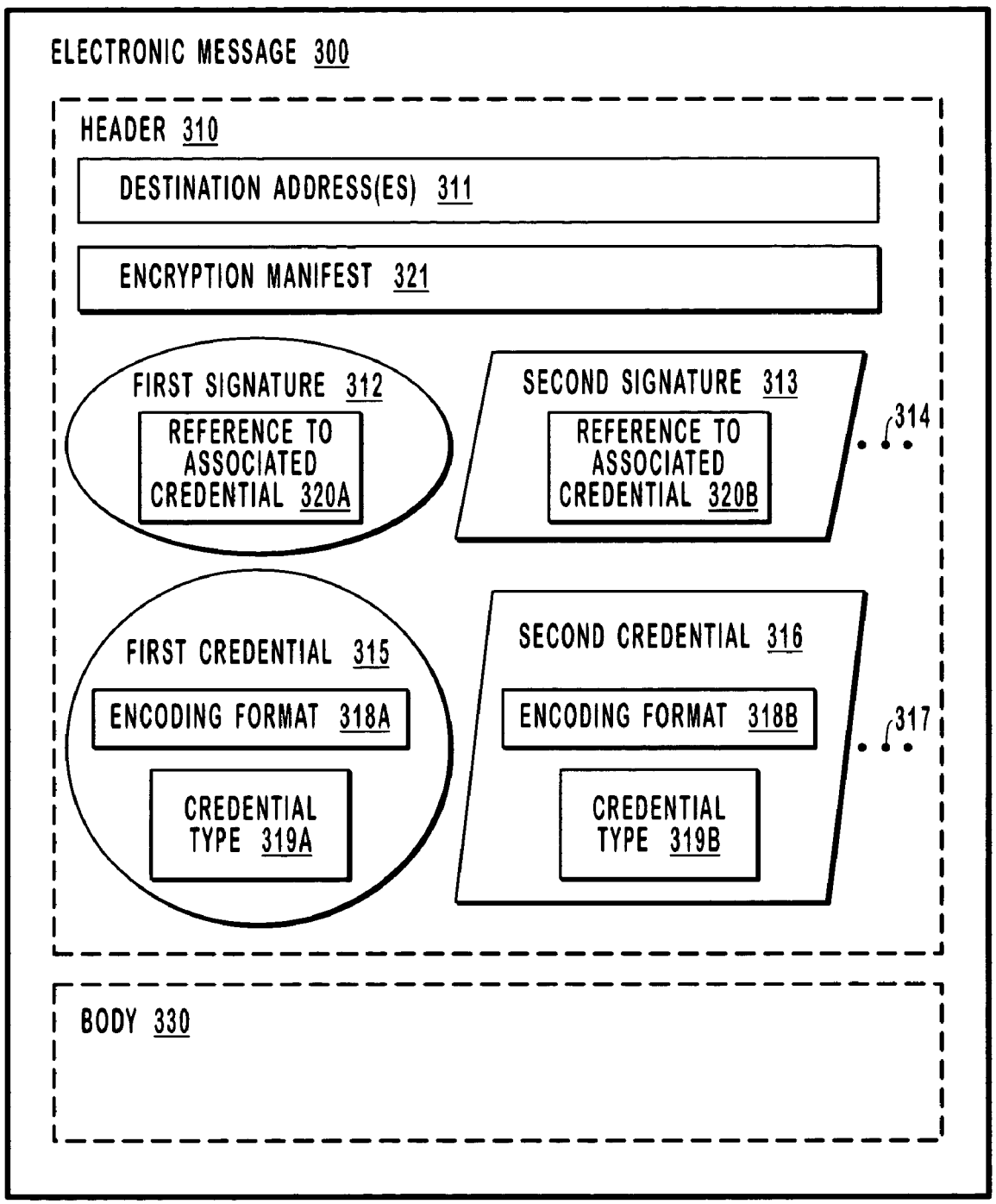
FIG. 3 illustrates a data structure of an electronic message having multiple different types of credentials in the header of the electronic message in accordance with the principles of the present invention.

The method 200 includes a functional, result-oriented step for constructing an electronic message so as to provide increased security (step 210). This functional, result-oriented step may include any corresponding acts for accomplishing this result. However, in the illustrated embodiment, the step 210 includes corresponding acts 211 through 218. An example electronic message data structure is illustrated in FIG. 3 as electronic message 300. The method of FIG. 2 will be described with frequent reference to the electronic message data structure of FIG. 3.

The method 200 includes an act of designating at least one destination address in the electronic message (act 211). The destination address corresponds to one or more recipient computing systems. Referring to FIG. 3, the electronic message includes a header field 310 and a body field 330. The body field 330 may contain the content of the information desired to be communicated to the recipient(s), while the header field 310 contains information that facilitates proper and secure transport and processing of the electronic message. The header field 310 includes a destination address field 311 that contains the destination address or addresses of one or more desired recipients of the electronic message.

The header field 310 also includes an encryption manifest 321 (e.g., an XML encryption manifest) that identifies portions of the body field 330 that are encrypted. Accordingly, none, some, or all portions of the body field 330 may be encrypted. The opportunity to encrypt only selected portions of the body field 330 is advantageous as this allows for the more sensitive data in the body field 330 to be encrypted without expending unneeded processor cycles encrypting the less sensitive data in the body field 330 to thereby provide a suitable balance between processing efficiency and security.

The method 300 then includes an act of including one or more security tokens in a header portion of the electronic message (act 212). The one of more security tokens may be, for example, one or more signatures. For example, the header field 310 includes a first signature 312, a possible second signature 313, and potentially other signatures 314. The first signature 312 is oval-shaped to represent that the first signature may have been signed using a corresponding credential 315, which is also represented as being oval-shaped. The second signature 313 is trapezoidal-shaped to represent that the second signature may have been signed using a different corresponding credential 316, which is also represented as being trapezoidal-shaped.

In addition to including the signatures (act 212) or other security tokens in the electronic message, the method 300 includes an act of encoding one of more credentials (act 213), and then the act of including the one or more encoded credentials in the electronic message (act 214). In some cases, the credential(s) included in the electronic message may not be encoded at all thus eliminating act 213. In other cases, a credential will not be included in the electronic message either thus eliminating act 214. For example, there may not be any cause for including a credential if there is a reference to an associated credential field described below where the credential may be external to the electronic message.

The credentials may be, for example, any item of information that helps to identify and/or authenticate the credential provider. One type of credential is a license, which contains a set of related assertions signed by an authority. Some assertions may be about keys that may be used to sign and/or encrypt messages. Example licenses include X.509 certificates and Kerberos tickets. The owner of a license is a principle entity that can use the license authoritatively. Specifically, the principle has the knowledge necessary to apply the cryptographic keys located in the attached license or licenses attached therein. Another type of credential is biometric data about the user sending the electronic message. Such biometric data may include any information derived from the biology of the user such as retinal scan data, fingerprint data, DNA data, or any other data that may substantially uniquely identify a user based on the user's biology. In FIG. 3, the included credentials are represented by first credential 315, second credential 316, and other credentials 317.

The method 200 also includes an act of including, in the header portion, an identification of an encoding format of the credential(s) (act 215). This identification is represented in FIG. 3 for the first credential 315 by the encoding format field 318A. The identification is represented in FIG. 3 for the second credential 316 by the encoding format field 318B. Alternatively, the encoding format is not identified in the header portion thereby indicating that a default encoding format was used to encode the credential. The method 300 also includes an act of including, in the header portion, an identification of a type of the credential (act 216). For example, the type of credential may be an X.509 certificate or a Kerberos ticket. The identification of the type of credential is represented in FIG. 3 for the first credential 315 by the credential type field 319A, and for the second credential 316 by the credential type field 319B. This type of credential may be a human-readable expression or may just be any information from which the type of credential may be derived.

In this example, there is an identification of the encoding format and a credential type for each of the credentials included in the electronic message, although this is not necessary. For example, in cases in which the encoding format is the same for all of the credentials in the electronic message, the encoding format may be listed in just one portion of the electronic message. Similarly, if the credential type is the same for all of the credentials in the electronic message, the credential format may just be listed once. In addition, if a particular credential has a default encoding format (and/or credential type), then the particular encoding format (and/or credential type) need not be expressly included for that credential. Furthermore, in schema-based communication in which the schema is understood to both parties, the encoding type and/or the credential format may be implicit based on the position of the credential within the schema-based document.

Also, the identification of the encoding format and credential type are illustrated as being included in the corresponding credential field. If these fields are included in the corresponding credential field, acts 215 and 216 would occur concurrently with act 213 for that credential. However, the encoding format and type field may instead just be associated with the corresponding credential field.

The method 300 also includes an act of generating a reference indicating where a credential associated with the signature may be found (act 217), and including the reference in the header portion of the electronic message (act 218). The reference is represented in FIG. 3 for the first signature 312 by the reference to associated credential field 320A, and for the second signature 313 by the reference to associated credential field 320B. While the reference may include a reference to a position internal to the electronic message (e.g., credential fields 315 and 316), the reference may also be a Uniform Resource Locator (URL) that identifies a location external to the electronic message where the associated credential may be found.

The sending computing system then transmits the electronic message to one or more recipient computing systems (act 219), which then receive the electronic message (act 220). The electronic message may contain multiple different signatures that were generated using multiple different kinds of credentials. The recipient computing system may then select one of a multiple signatures included in a header portion of the electronic message (act 221), and then read that electronic signature from the electronic message (act 222). Accordingly, the recipient computing system may choose one, some, or all of the included signatures depending on which one the recipient computing system is configured to process and trust.

Figure 4A:
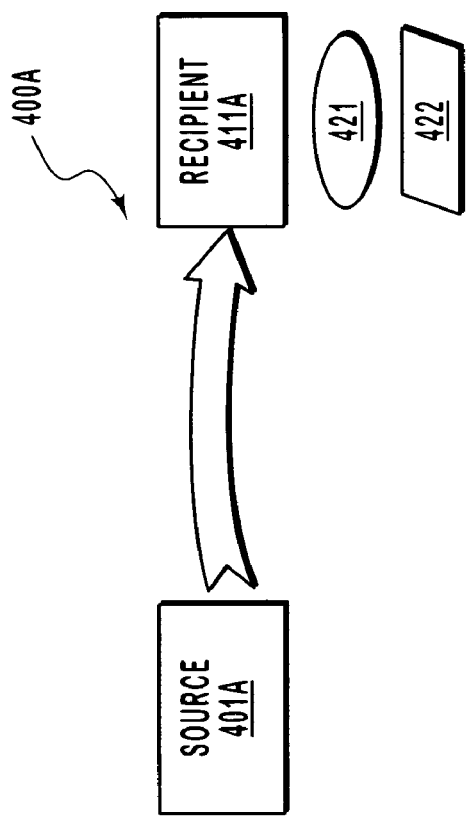
FIG. 4A illustrates a network environment in which multiple different credentials are used to identify a source computing system to a particular recipient computing system in a model called herein the "multiple credential—single recipient model"

The ability of the electronic message 300 to contain multiple credentials of different types allows for several novel network security configurations. For example, FIG. 4A illustrates a network environment 400A in which multiple different credentials are used to identify a source computing system 401A to a particular recipient computing system 411A in a model called herein the "multiple credential—single recipient model". In this model, a single recipient computing system 411A uses two different credentials 421 and 422 in order to authenticate the source computing system 401A. The credentials are illustrated in FIGS. 4A through 4D as having different shapes to emphasize that the credentials may be of different types.

Figure 4B:
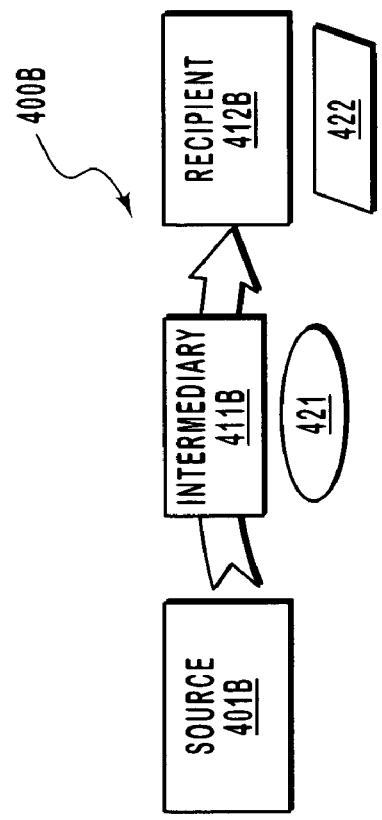
FIG. 4B illustrates a network environment in which different credentials in the electronic message may be used to identify the source computing system to an intermediary computing system and to identify the source computing device to a recipient computing system in a model called herein the "serial credential model"

FIG. 4B illustrates a network environment 400B in which different credentials in the electronic message may be used to identify a source computing system 401B to an intermediary computing system 411B and to identify the source computing device 401B to a recipient computing system 412B in a model called herein the "serial credential model". In the illustrated serial credential model 400B, the intermediary computing system 411B uses the credential 421, while the recipient computing system 412B uses the credential 422.

Figure 4C:
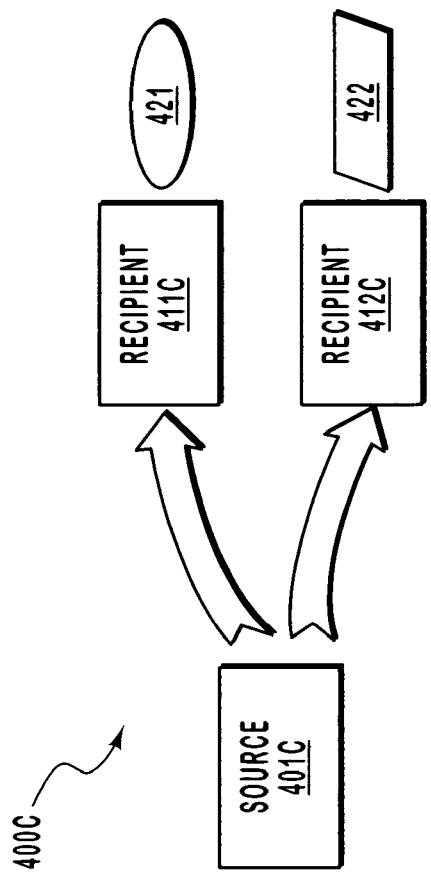
FIG. 4C illustrates a network environment in which different credentials in the electronic message may be used to identify the source computing system to different recipient computing systems in a model called herein the "parallel credential model"

FIG. 4C illustrates a network environment 400C in which different credentials in the electronic message may be used to identify the source computing system 401C to different recipient computing devices 411C and 412C in a model called herein the "parallel credential model". In the illustrated parallel credential model 400C, the recipient computing system 411C uses the credential 421, while the recipient computing system 412C uses the credential 422.

Figure 4D:
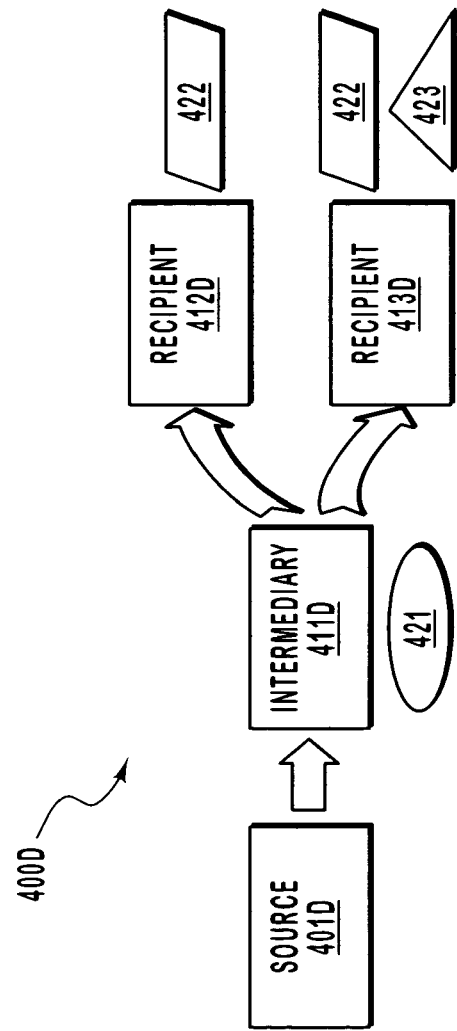
FIG. 4D illustrates a network environment which combines all of the models of FIGS. 4A, 4B and 4C.

There are various combinations of each of the models of FIG. 4A through 4C that make a practically limitless variety of network configurations. For example, FIG. 4D illustrates a network environment 400D which combines all of the models of FIGS. 4A, 4B and 4C in one of many possible ways. In the environment 400D, the electronic message includes three credentials 421, 422 and 423. Credential 423 is different than credentials 421 and 422 as represented by its triangular shape. The intermediary computing system 411C uses credential 421, recipient computing system 412D uses credential 422, and recipient computing system 413D uses credentials 422 and 423.

Returning to FIG. 2, the receiving computing system also may read the reference that indicates where an associated credential may be found (act 223), use that reference to find the credential (act 224), and then determine if the credential corresponds with the electronic signature (act 225). If the referenced credential corresponds to the signature, then the data signed can be associated with the credential. Accordingly, the integrity of any statements made in the credentials such as identity, rights, and so forth, may be more assured, especially if the referenced credential was external to the electronic message and thus not subject to the same tampering instances that the electronic message may be subject to.

In one embodiment, the electronic message 300 may be a Simple Object Access Protocol (SOAP) envelope although this is not required. The two provisional patent applications previously incorporated herein by reference provide several examples of SOAP envelopes which incorporate various aspects of the present invention. The following SOAP envelope is a code example of one specific embodiment of the data structure of the electronic message 300. The code example is represented in eXtensible Markup Language (XML) version 1.0. Line numbering has been added for clarity in explaining the structure of the code example. Although this code example shows one specific implementation, there are a vast variety of different implementations that may employ the principles of the present invention. For example, although this example illustrates the use of headers hierarchically structured in a certain way and having particular header uses, other embodiments may have a different hierarchy and usage of headers without departing from the scope of the principles of the present invention.

```
1.   <?xml version="1.0" encoding="utf-8"?>
2.   <S:Envelope
3.          xmlns:S="http://schemas.xmlsoap.org/soap/envelope/"
4.          xmlns:xsd="http://www.w3.org/2001/XMLSchema"
5.          xmlns:xsi="http://www.w3.org/2001/XMLSchema-instance>
6.      <Header>
7.        <m:path xmlns:m="http://schemas.xmlsoap.org/rp">
8.          PATH INFORMATION
9.        </m:path>
10.       <wssec:credentials
11.         xmlns:wssec="http://schemas.xmlsoap.org/ws/2001/10/security">
12.         <wslic:binaryLicence
13.           xmlns:wslic="http://schemas.xmlsoap.org/ws/2001/10/licenses"
14.           wslic:valueType="wslic:x509v3"
15.           xsi:type="xsd:base64Binary"
16.           id="X509License">
17.              X509LICENSE ENCODED IN BASE64BINARY
18.         </wslic:binaryLicense>
19.         <wslic:binaryCredential xmlns:tru="...">
20.           wslic:valueType="tru:binaryCredentialFormat"
21.           xsi:type="xsd:base64Binary"
22.           id="BinaryCredential">
23.              BINARY CREDENTIAL ENCODED IN BASE64BINARY
24.         </wslic:binaryCredential>
25.       </wssec:credentials>
26.       <wssec:integrity>
27.         <ds:Signature xmlns:ds="http://www.w3.org/2000/09/xmldsig#">
28.           <ds:SignedInfo>
29.             <ds:CanonicalizationMethod
30.               Algorithm="http://www.w3.org/Signature/Drafts/xml-exc-c14n"/>
31.             <ds:SignatureMethod
32.               Algorithm"http://www.w3.org/2000/09/xmldsig#rsa-sha1"/>
33.             <ds:Reference>
34.               <ds:Transforms>
35.                 <ds:Transform Algorithm="http://schemas.xmlsoap.org/
36.                   2001/10/security#RoutingSignatureTransform"/>
37.                 <ds:Transform Algorithm="http://www.w3.org/
38.                   TR/2001/REC-xml-c14n-20010315/>
39.               </ds:Transforms>
40.               <ds:DigestMethod Algorithm="http://www.w3.org/
41.                 2000/09/xmldsig#sha1"/>
42.             </ds:Reference>
43.           </ds:SignedInfo>
44.           <ds:SignatureValue>
45.              FIRST SIGNATURE VALUE
46.           </ds:SignatureValue>
47.           <ds:KeyInfo>
48.             <wssec:LicenseLocation="#X509License"/>
49.           </ds:KeyInfo>
50.         </ds:Signature>
51.         <ds:Signature>
52.           <ds:SignedInfo>
53.             <ds:CanonicalizationMethod
54.               Algorithm="http://www.w3.org/Signature/Drafts/xml-exc-c14n"/>
55.             <ds:SignatureMethod
56.               Algorithm"http://www.w3.org/2000/09/xmldsig#rsa-sha1"/>
57.             <ds:Reference>
58.               <ds:Transforms>
59.                 <ds:Transform Algorithm="http://schemas.xmlsoap.org/
60.                   2001/10/security#RoutingSignatureTransform"/>
61.                 <ds:Transform Algorithm="http://www.w3.org/
62.                   TR/2001/REC-xml-c14n-20010315/>
63.               </ds:Transforms>
64.               <ds:DigestMethod Algorithm="http://www.w3.org/
65.                 2000/09/xmldsig#sha1"/>
66.             </ds:Reference>
67.           </ds:SignedInfo>
68.           <ds:SignatureValue>
69.              SECOND SIGNATURE VALUE
70.           </ds:SignatureValue>
71.           <ds:KeyInfo>
72.             <wssec:LicenseLocation="#BinaryCredential"/>
73.           </ds:KeyInfo>
74.         </ds:Signature>
75.       </wssec:integrity>
76.     </S:Header>
77.     <S:Body>
```

```
78.        BODY
79.      </S:Body>
80.  </S:Envelope>
```

Line 1 defines the XML version that the SOAP envelope follows as well as the encoding format for the SOAP envelope as a whole.

Lines 2 through 80 define a SOAP envelope that includes two different credentials, two different signatures signed using the credentials, and references to the credentials for each of the signatures. Also, the encoding type and format type of each of the credentials is specified.

Lines 3 through 5 define global namespace abbreviations used throughout the SOAP envelope. It is standard practice to specify namespace abbreviation in this portion of the SOAP envelope. These namespace abbreviations correspond to a namespace that defines a standard for how particular elements to which the namespace applies are to be interpreted.

Lines 77 though 79 represent the body of the SOAP envelope and is an example of the body field 330 of FIG. 3. Note that the actual body content is replaced with the capitalized term "BODY". Capitalized terms are used throughout the code example to replace actual content whose value is not specifically included in the code example and the value is not important to the principles of the present invention. For example, the term "BODY" in line 78 could be any content without affecting the principles of the present invention.

Lines 6 though 76 represent the header information for the SOAP envelope and is an example of the header field 310 of FIG. 3.

Lines 7 through 9 express the path that the electronic message is to take. Intermediary computing systems such as intermediary computing system 411B of FIG. 4B may be specified in this section.

Lines 10 through 25 define a unique SOAP header called "credentials". This header may include several different credential types. The encoding format and type of the credential may also be specified in this header.

For instance, lines 12 through 18 contain a binary license (see line 17) called "X509License" (see line 16), which is identified as being an X.509 certificate (see line 14), and which is identified as being encoded using base64binary encoding (see line 15). Line 14 is an example of the credential type field 319A of FIG. 3. Line 15 is an example of the encoding format field 318A of FIG. 3. Line 17 is an example of the first credential field 315 of FIG. 3.

Also, lines 19 through 24 contain a binary credential (see line 23) called "BinaryCredential" (see line 22), which is identified as being in a binary credential format (see line 20), and which is identified as being encoded also using base64binary encoding (see line 21). Line 20 is an example of the credential type field 319B of FIG. 3. Line 21 is an example of the encoding format field 318B of FIG. 3. Line 23 is an example of the second credential field 316 of FIG. 3.

Lines 26 through 75 define an "integrity" header that contains two signatures, each having a reference location to find a corresponding credential that may be used to verify the integrity of the electronic message (i.e., that the electronic message was sent by the signer of the signature, and that the electronic message has not been altered in transit).

In particular, a first signature element is referenced from lines 27 through 50, with the second signature element being referenced from lines 51 through 74. Each signature element follows the schema defined by XML digital signature in accordance with the "http://www.w3.org/2000/09/xmldsig#" namespace. However, that KeyInfo child element within each XML digital signature includes a "LicenseLocation" element that references the location of a license (or other credential) that may be used to verify the integrity of the electronic message.

The first signature element includes a "SignedInfo" element from lines 28 through 43 which defines canonicalization methods, digest algorithms, and various transforms that apply to the signature. The first signature value is included at line 45 and is an example of the first signature field 312 of FIG. 3. The license location specified at line 48 is an example of the reference to associated credential field 320A of FIG. 3.

The second signature element is similar to the first signature element except that the second signature value is at line 69 and represents an example of second signature field 313 of FIG. 3, while the license location is specified at line 72 and represents an example of the reference to associated credential field 320B of FIG. 3.

Although the specific code example above includes the multiple credentials and signatures in the header portion of a SOAP envelope, the credential and/or signature information may also be included within the header portion of a HyperText Transport Protocol (HTTP) message. Accordingly, the principles of the present invention allow for the communication of one or more different credentials in a single electronic message. In addition, the reference to an associated credential allows for the integrity of electronic messages to be verified.

Figure 5:
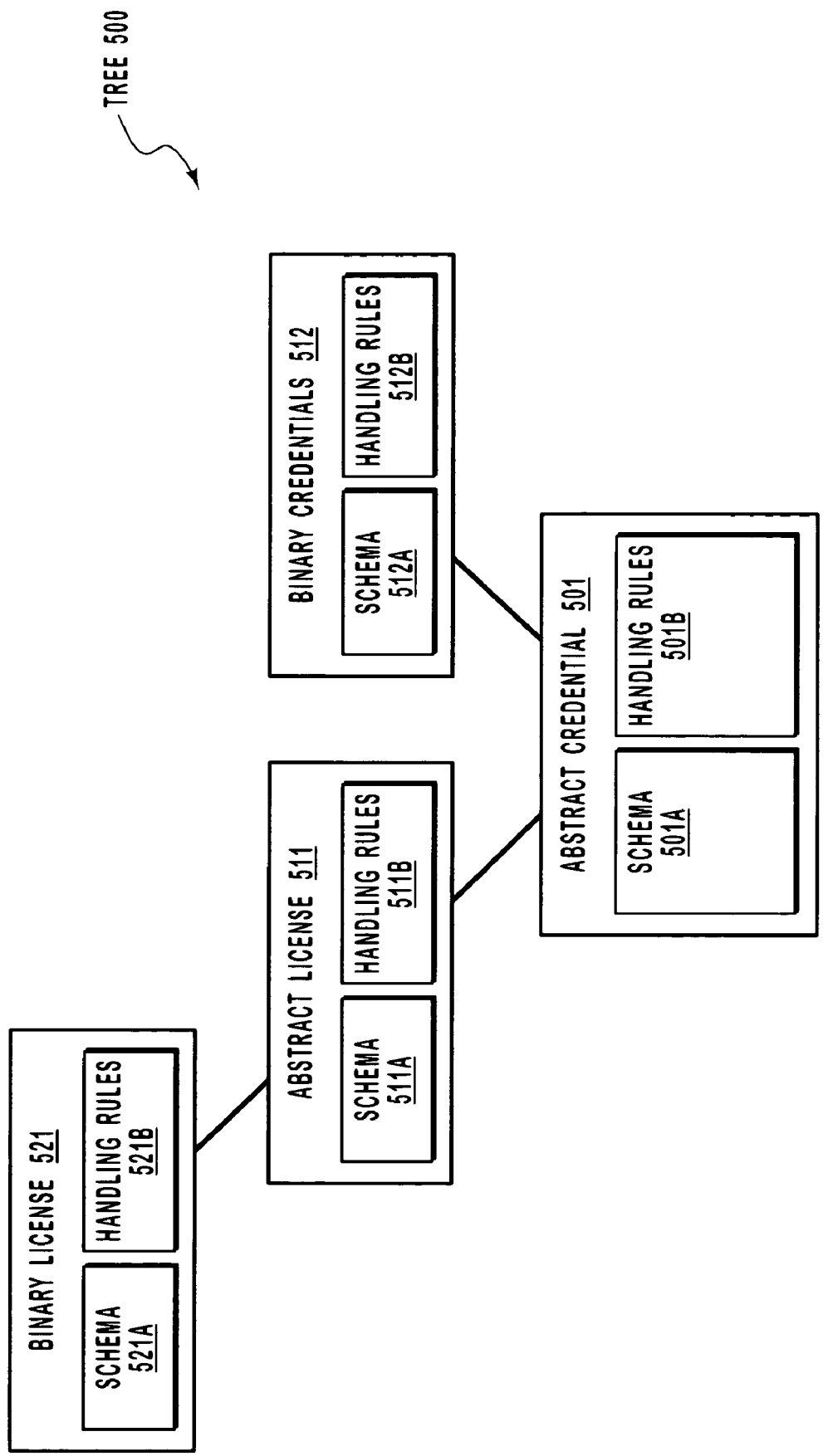
FIG. 5 illustrates a credential semantic inheritance tree in accordance with the principles of the present invention.

In the above code example, there are two different credentials included in the electronic message, a binary license and a binary credential. These credential types may be abstractly structured in an inheritance tree. A hierarchically-structured credential semantics inheritance tree that includes these credential types is illustrated as tree 500 in FIG. 5.

The tree 500 includes an abstract credential data type 501 at its base. The abstract credential is structured in accordance with a schema 501A and has handling rules 501B. The schema 501A describes the basic structure of the abstract credential data type. The handling rules 501B describe how to handle the abstract credential.

One of the first-tier branches of the tree 500 is an abstract license data type 511, which includes an extended schema 511A and extended handling rules 511B. The schema and the handling rules from parent nodes in the tree 500 may be inherited by the child nodes. In other words, the schema 511A of the abstract license may reflect the schema 501A of the abstract credential with some specified extensions. Also, the handling rules 511B may represent further handling rules in addition to the handling rules 501B specified at the abstract credential data type.

Another of the first-tier branches of the tree 500 is a binary credential data type 512 that includes schema 512A and handling rules 512B. A second tier-branch of the tree includes binary license 521 having schema 521A and handling rules 521B. The tree 500 may be further expanded by defining a schema that extends on the schema of a parent node, and/or by defining further handling rules in addition to those provided for a parent node.

When determining how to structure a binary license for example, the source computing system would use the schema 521A. If the schema 521A represented incremental structural changes rather than a complete structural definition, the source computing system may also consult the schema of ancestral data types 511 and 501 to determine the final structural form of the binary license. When receiving a binary license, the recipient computing system may use the schema 521A to determine how to parse the binary license, along with the handling rules 521B to determine how to treat the binary license in terms of how to process the binary license and what authorities to grant in response to the binary license. The handling rules 521B may represent incremental handling rules in which case the ancestral handling rules 511B and 501B may also be consulted to determine proper handling. The tree 500 may be stored at both the source computing system and the recipient computing system so as to ensure consistent treatment of credentials.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network environment that includes a plurality of computing systems capable of communicating using electronic messaging, a method for a source computing system constructing an electronic message, the method comprising the following:
   an act of designating at least one destination address in the electronic message, the destination address corresponding to one or more recipient computing devices;
   an act of including a first security token in a header portion of the electronic message, wherein the electronic message is a Simple Object Access Protocol (SOAP) envelope in which the header portion is the header portion of the SOAP envelope, the first security token being at least derived from a first credential of a first credential type; and
   an act of including a second security token in the header portion of the electronic message, the second security token being at least derived from a second credential of a second credential type.

2. The method in accordance with claim 1, wherein the first security token is biometric data.

3. The method in accordance with claim 1, further comprising the following:
   an act of including an encryption manifest in the header portion to thereby designate portions of a body portion of the electronic message that are encrypted.

4. The method in accordance with claim 1, further comprising the following:
   an act of transmitting the electronic message with the first security token and the second security token in the header portion to the one or more recipient computing devices.

5. The method in accordance with claim 1, wherein the first security token is the first credential.

6. The method in accordance with claim 1, wherein the first security token is a first signature that was generated using the first credential.

7. The method in accordance with claim 6, further comprising the following:
   an act of including the first credential in the electronic message.

8. The method in accordance with claim 1, wherein the second security token is the second credential.

9. The method in accordance with claim 1, wherein the second security token is a second signature that was generated using the second credential.

10. The method in accordance with claim 9, further comprising the following:
    an act of including the second credential in the electronic message.

11. The method in accordance with claim 1, wherein the at least one destination address corresponds to at least a first and a second recipient computing system, the first computing system using the first credential to identify the source computing system, and the second computing system using the second credential to identify the source computing system.

12. The method in accordance with claim 11, further comprising the following:
    an act of determining that the first recipient computing system uses the first credential to identify the source computing system; and
    an act of determining that the second recipient computing system uses the second credential to identify the source computing system.

13. The method in accordance with claim 1, wherein the at least one destination address corresponds to at least a first recipient computing system that uses both of the first credential and the second credential to identify the source computing system.

14. The method in accordance with claim 13, further comprising the following:
    an act of determining that the first recipient computing system uses both of the first credential and the second credential to identify the source computing system.

15. The method in accordance with claim 1, wherein the at least one destination address corresponds to at least a first recipient computing system that uses the first credential and the second credential to identify the source computing system, the electronic message also traversing through an intermediary computing system that uses the second credential to identify the source computing system.

16. The method in accordance with claim 15, further comprising the following:
    an act of determining that the first recipient computing system uses the first credential to identify the source computing system; and
    an act of determining that the intermediary computing system uses the second credential to identify the source computing system.

17. The method in accordance with claim 15, further comprising:
    an act of designating an intermediary address that corresponds to the intermediary computing device.

18. The method in accordance with claim 1, further comprising
    an act of encoding the first security token;
    an act of including, in the header portion, an identification of an encoding format of the first security token; and
    an act of including, in the header portion, an identification of a type of the security token.

19. The method in accordance with claim 18, wherein the security token comprises a credential.

20. The method in accordance with claim 1, wherein the first security token is a signature generated by a user, the method further comprising:
   an act of generating a reference indicating where a credential associated with the user may be found;
   an act of including the reference in the header portion of the electronic message.

21. The method in accordance with claim 1, wherein the electronic message is a HyperText Transport Protocol (HTTP) message, and wherein the header portion is a header portion of the HTTP message.

22. A computer program product for use in a network environment that includes a plurality of computing systems capable of communicating using electronic messaging, the computer program product for implementing a method for a source computing system constructing an electronic message, the computer program product comprising one or more computer-readable physical storage media have thereon the following:
   computer-executable instructions for designating at least one destination address in the electronic message, the destination address corresponding to one or more recipient computing devices;
   computer-executable instructions for including a first security token in a header portion of the electronic message, wherein the electronic message is a Simple Object Access Protocol (SOAP) envelope in which the header portion is the header portion of the SOAP envelope, the first security token being at least derived from a first credential of a first credential type; and
   computer-executable instructions for including a second security token in the header portion of the electronic message, the second security token being at least derived from a second credential of a second credential type.

23. The computer program product in accordance with claim 22, wherein the one or more computer-readable media further have thereon the following:
   computer-executable instructions for determining that a first recipient computing system uses the first credential to identify the source computing system; and
   computer-executable instructions for determining that a second recipient computing system uses the second credential to identify the source computing system.

24. The computer program product in accordance with claim 22, wherein the one or more computer-readable media further have thereon the following:
   computer-executable instructions for determining that a first recipient computing system uses both of the first credential and the second credential to identify the source computing system.

25. The computer program product in accordance with claim 22, wherein the one or more computer-readable media further have thereon the following:
   computer-executable instructions for determining that a first recipient computing system uses the first credential to identify the source computing system; and
   computer-executable instructions for determining that an intermediary computing system uses the second credential to identify the source computing system.

26. A computer program product for use in a network environment that includes a plurality of computing systems capable of communicating using electronic messaging, a method for identifying a source computing system of an electronic message, the computer program product comprising one or more physical computer-readable storage media having stored thereon the following:
   computer-executable instructions for detecting the receipt of an electronic message, wherein the electronic message is a Simple Object Access Protocol (SOAP) envelope, and wherein the credential is included in a header portion of the SOAP envelope;
   computer-executable instructions for reading a credential from the electronic message;
   computer-executable instructions for determining how to handle the credential and the electronic message based on a position of the credential within a logical hierarchical tree of credentials;
   computer-executable instructions for handling the credential and the electronic message as determined.

27. A computer program product in accordance with claim 26, wherein the computer-executable instructions for determining how to handle the credential and the electronic message comprise the following:
   computer-executable instructions for consulting handling rules of at least one ancestral credential in the logical hierarchical tree;
   computer-executable instructions for consulting extended handling rules specific to the credential included in the electronic message; and
   computer-executable instruction for determining handling rules for the credential included in the electronic message by using the handling rules for the at least one ancestral credential as well as the extended handling rules specific to the credential included in the electronic message.

28. The computer program product in accordance with claim 26, wherein the credential includes biometric data.

29. The computer program product in accordance with claim 26, wherein the electronic message is a HyperText Transport Protocol (HTTP) message, and wherein the credential is included in a header portion of the HTTP message.

30. In a network environment that includes a plurality of computing systems capable of communicating using electronic messaging, a method for a source computing system constructing an electronic message, the method comprising the following:
   an act of encoding a credential that identifies the source computing device;
   an act of including the credential in a header portion of an electronic message, wherein the electronic message is a Simple Object Access Protocol (SOAP) envelope, and wherein the header portion is a header portion of the SOAP envelope; and
   an act of including, in the header portion, information indicative of a type of the credential.

31. A method in accordance with claim 30, wherein the information indicative of a type of the credential comprises a human-readable expression of the type of the credential.

32. A method in accordance with claim 30, wherein the information indicative of a type of the credential comprises information that is not a human-readable expression of the type of the credential, but nonetheless is information from which the type of credential may be derived.

33. A method in accordance with claim 30, further comprising the following:
   an act of including in the header portion, an identification of an encoding format of the credential.

34. A method in accordance with claim 30, wherein an identification of an encoding format of the credential is not included in the header portion thereby indicating that a default encoding format has been applied.

35. The method in accordance with claim 30, further comprising the following:

an act of including an encryption manifest in the header portion to thereby designate portions of a body portion of the electronic message that are encrypted.

36. The method in accordance with claim 30, wherein the credential includes biometric data.

37. The method in accordance with claim 30, wherein the electronic message is a HyperText Transport Protocol (HTTP) message, and wherein the header portion is a header portion of the HTTP message.

38. A method in accordance with claim 30, wherein the credential is a license.

39. A method in accordance with claim 38, wherein the credential is in a binary format, wherein the act of including, in the header portion, an identification of a type of the credential comprises an act of including, in the header portion, an indication that the credential has the binary format.

40. A method in accordance with claim 30, wherein the credential is in a binary format, wherein the act of including, in the header portion, an identification of a type of the credential comprises an act of including, in the header portion, an indication that the credential has the binary format.

41. A computer program product for use in a network environment that includes a plurality of computing systems capable of communicating using electronic messaging, the computer program product for implementing a method for a source computing system constructing an electronic message, the computer program product comprising one or more physical computer-readable storage media having stored thereon the following:

a first software module that, when executed by one or more processors, is adapted to encode a credential that identifies the source computing device, wherein the credential is a license;

a second software module that, when executed by one or more processors, is adapted to include the credential in a header portion of the electronic message, wherein the electronic message is a Simple Object Access Protocol (SOAP) envelope, and wherein the header portion is a header portion of the SOAP envelope;

a third software module that, when executed by one or more processors, is adapted to include, in the header portion, an identification of an encoding format of the credential; and a fourth software module that, when executed by one or more processors, is adapted to include, in the header portion, an identification of a type of the credential.

42. In a network environment that includes a plurality of computing systems capable of communicating using electronic messaging, a method for a source computing system constructing an electronic message, the method comprising the following:

an act of including an electronic signature in a header portion of an electronic message, wherein the electronic message is a Simple Object Access Protocol (SOAP) envelope, and wherein the header portion is a header portion of the SOAP envelope, the electronic signature generated by a user;

an act of generating a reference indicating where a credential associated with the electronic signature may be found;

an act of including the reference in the header portion of the electronic message.

43. The method in accordance with claim 42, further comprising the following:

an act of including an encryption manifest in the header portion to thereby designate portions of a body portion of the electronic message that are encrypted.

44. A method in accordance with claim 42, wherein the reference indicates that the associated credential may be found at a location that is internal to the electronic message.

45. A method in accordance with claim 42, wherein the reference indicates that the associated credential may be found at a location that is external to the electronic message.

46. The method in accordance with claim 42, wherein the credential includes biometric data.

47. The method in accordance with claim 42, wherein the electronic message is a HyperText Transport Protocol (HTTP) message, and wherein the header portion is a header portion of the HTTP message.

48. In a network environment that includes a plurality of computing systems capable of communicating using electronic messaging, a method for a recipient computing system to verify the identity of a sender of an electronic message, the method comprising the following:

an act of receiving the electronic message;

an act of reading an electronic signature from a header portion of the electronic message, the electronic signature generated by a user, wherein the electronic message is a Simple Object Access Protocol (SOAP) envelope, and wherein the header portion is a header portion of the SOAP envelope;

an act of reading a reference from the header portion, the reference indicating where a credential associated with the user may be found;

an act of using the reference to find the credential; and an act of determining if the credential corresponds with the electronic signature.

49. A method in accordance with claim 48, wherein the reference indicates that the associated credential may be found at a location that is internal to the electronic message.

50. A method in accordance with claim 48, wherein the reference indicates that the associated credential may be found at a location that is external to the electronic message.

51. A computer program product for use in a network environment that includes a plurality of computing systems capable of communicating using electronic messaging, the computer program product for implementing a method for a recipient computing system to verify the identity of a sender of an electronic message, the computer program product comprising one or more physical computer-readable storage media having thereon the following:

computer-executable instructions for detecting the receipt of the electronic message;

computer-executable instructions for reading an electronic signature from a header portion of the electronic message, the electronic signature generated by a user, wherein the electronic message is a Simple Object Access Protocol (SOAP) envelope, and wherein the header portion is a header portion of the SOAP envelope;

computer-executable instructions for reading a reference from the header portion, the reference indicating where a credential associated with the user may be found;

computer-executable instructions for using the reference to find the credential; and computer-executable instructions for determining if the credential corresponds with the electronic signature.

52. In a network environment that includes a plurality of computing systems capable of communicating using electronic messaging, a method for a source computing system constructing a Simple Object Access Protocol envelope, the method comprising the following:
- an act of designating at least one destination address in the SOAP envelope, the destination address corresponding to one or more recipient computing devices; and
- an act of including a first security token in a header portion of the SOAP envelope, the first security token being at least derived from a first credential of a first credential type.

53. The method in accordance with claim 52, further comprising the following:
- an act of including a second security token in the header portion of the SOAP envelope, the second security token being at least derived from a second credential of a second credential type.

* * * * *